(12) United States Patent
Tsirkin

(10) Patent No.: US 12,498,949 B2
(45) Date of Patent: Dec. 16, 2025

(54) LIBRARY BASED VIRTUAL MACHINE MIGRATION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 639 days.

(21) Appl. No.: 17/190,252

(22) Filed: Mar. 2, 2021

(65) Prior Publication Data

US 2022/0283835 A1    Sep. 8, 2022

(51) Int. Cl.
*G06F 9/455*    (2018.01)

(52) U.S. Cl.
CPC .. *G06F 9/45558* (2013.01); *G06F 2009/4557* (2013.01)

(58) Field of Classification Search
CPC .................. G06F 9/45558; G06F 2009/4557
See application file for complete search history.

(56) References Cited

U.S. PATENT DOCUMENTS

| | | | |
|---|---|---|---|
| 9,116,803 | B1 | 8/2015 | Agrawal et al. |
| 9,590,917 | B2 | 3/2017 | Karunamoorthy et al. |
| 9,720,724 | B2 | 8/2017 | Agrawal et al. |
| 9,928,056 | B1* | 3/2018 | Chittigala ............. G06F 9/5077 |
| 10,432,727 | B1 | 10/2019 | Singh et al. |
| 10,437,865 | B1* | 10/2019 | Clements .............. G06F 16/273 |
| 10,579,409 | B2 | 3/2020 | Beveridge et al. |
| 11,074,092 | B2* | 7/2021 | Dong .................... G06F 9/5077 |
| 11,468,087 | B1* | 10/2022 | Slember ................ G06F 9/547 |
| 2010/0257523 | A1* | 10/2010 | Frank .................. G06F 9/45558 718/1 |
| 2014/0359213 | A1* | 12/2014 | Messec ............... G06F 9/45558 711/114 |
| 2015/0249618 | A1* | 9/2015 | Golander ............... H04L 47/70 709/224 |
| 2015/0347165 | A1* | 12/2015 | Lipchuk ..................... G06F 8/63 718/1 |
| 2016/0337445 | A1* | 11/2016 | Kono ...................... H04L 67/34 |
| 2017/0003997 | A1 | 1/2017 | Kelly et al. |
| 2017/0277555 | A1* | 9/2017 | Gautam ................ G06F 16/137 |

(Continued)

FOREIGN PATENT DOCUMENTS

CN    105577727 A    5/2016

OTHER PUBLICATIONS

Carrion et al., "A Generic Catalog and Repository Service for Virtual Machine Images" Jan. 2010, Conference: 2nd International ICST Conference on Cloud Computing (CloudComp 2010), https://www.researchgate.net/publication/233906883_A_Generic_Catalog_and_Repository_Service_for_Virtual_Machine_Images.

*Primary Examiner* — Lewis A Bullock, Jr.
*Assistant Examiner* — Kevin X Lu
(74) *Attorney, Agent, or Firm* — Womble Bond Dickinson (US) LLP

(57) ABSTRACT

A method includes determining to migrate a guest VM from a source host to a destination host and, in response to determining to migrate the guest VM, determining that a page of the guest VM matches a page of a VM image of a plurality of VM images in a VM library associated with the source host. The method further includes forwarding an identifier of the page of the VM image to the destination host, the destination host to retrieve, in view of the identifier, the page of the VM image from a second VM library associated with the destination host to instantiate the guest VM at the destination host.

9 Claims, 6 Drawing Sheets

(56) References Cited

U.S. PATENT DOCUMENTS

| | | | |
|---|---|---|---|
| 2018/0213036 A1* | 7/2018 | Vasetsky | H04L 41/082 |
| 2019/0227726 A1* | 7/2019 | Zaydman | G06F 16/113 |
| 2020/0174934 A1* | 6/2020 | Zaydman | G06F 16/9014 |
| 2022/0214901 A1* | 7/2022 | Tsirkin | G06F 12/1009 |

* cited by examiner

LIBRARY BASED VIRTUAL MACHINE MIGRATION

TECHNICAL FIELD

Aspects of the present disclosure relate to virtual machine migration, and more particularly, library based virtual machine migration.

BACKGROUND

Virtual machine migration includes moving a virtual machine from one physical hardware environment to another. During virtual machine migration the virtual machine, including the storage, memory, operating state, etc., is copied over a network from a source host machine to a destination host machine.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In some virtualization platforms that are distributed across several computing nodes (i.e., host machines), a virtual machine may be migrated from one computing node to another for purposes of load balancing, networking, etc. The virtual machine migration may include transferring the virtual machine over a network from a source computing node to a destination computing node. Conventional systems perform migration of a virtual machine by copying the virtual machine state (e.g., state of processor, memory, storage, etc.) over the network from the source to the destination. However, conventional virtual machine migration may utilize a large amount of network resources, especially when several virtual machines are being migrated over the network. This network utilization may cause bottlenecks in the network and hinder performance of the system.

Aspects of the disclosure address the above-noted and other deficiencies by providing for a library based virtual machine migration. During a virtual machine migration, rather than copying all of the contents of the virtual machine to a destination host, each host in a computing system, e.g., in a cluster, may store a library of virtual machine images that are commonly used. Upon migration of a virtual machine, processing logic determines if any portions of the virtual machine images in the library match a portion of the virtual machine to be migrated. An identifier of the portions of the virtual machine images that match may be forwarded to the destination host where the identifier of the portions can be used to retrieve those portions from the library local to the destination host. Accordingly, the portions that match are not required to be copied over a network to the destination host. Those portions can simply be retrieved from the library.

The library may include images of one or more standard virtual machines that may be commonly used or executed. The virtual machine images in the library may be bare-metal virtual machines that does not include any applications, or may include standard applications. Each of the virtual machine images may be a virtual machine with a common configuration that is started and then paused to create the standard virtual machine images. The library may be copied to each host machine that is installed on the cluster. Thus, each host machine may include the same standard library locally.

Advantages of the present disclosure include reduced network traffic load within the cluster because the amount of data copied over the network for each migration is reduced. Similarly, performance (e.g., latency) of the virtualization platform may be improved due to the reduction in network traffic and reduced time to complete virtual machine migrations. Accordingly, network bottlenecks due to heavy network traffic from virtual machine migration may be reduced or eliminated.

Figure 1:
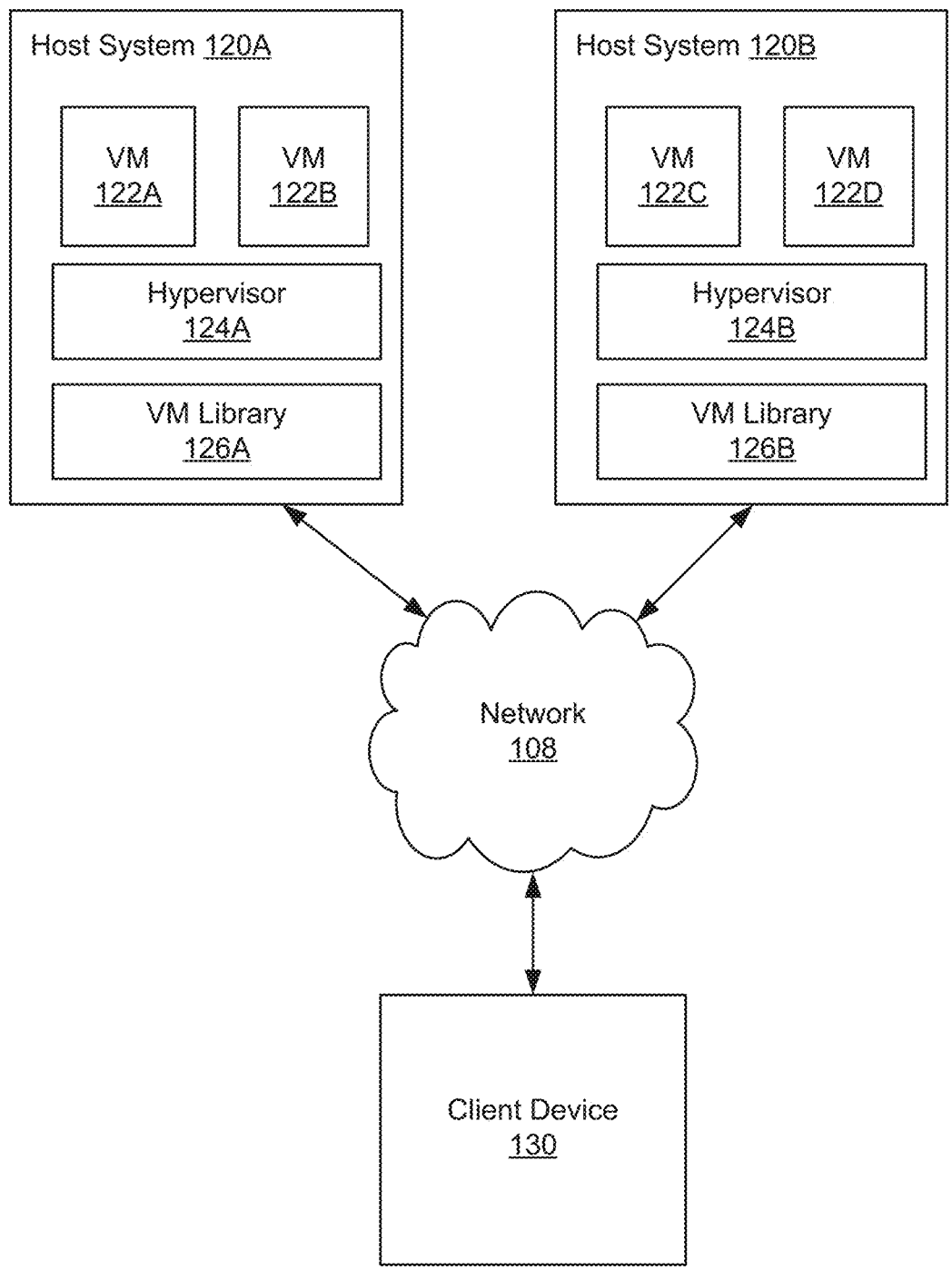
FIG. 1 is a system diagram that illustrates an example system for library based virtual machine migration, in accordance with some embodiments.

FIG. 1 is a system diagram illustrating a system 100 for library based virtual machine migration. System 100 may include several host systems 120A-B, for example, in a cluster, a data center, or the like. Each host system 120A-B may host one or more virtual machines (VMs), such as VMs 122A-B on host system 120A and VMs 122C-D on host system 120B. Although depicted as executing two VMs, each host system may execute any number of virtual machines. Each host system 120A-B may also include a hypervisor 124A-B for managing the VMs 122A-D. The hypervisors 124A-B may provide a virtual operating platform for VMs 122A-D and manage their execution. Hypervisors 122A-B may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisors 124A-B, though typically implemented in software, may emulate and export a bare machine interface to higher level software in the form of virtual processors and guest memory.

In one example, host systems 120A-B may be coupled via network 108. Network 108 may be any type of network such as a public network (e.g., the Internet), a private network (e.g., a local area network (LAN), Wi-Fi, or a wide area network (WAN)), or a combination thereof. A client device 130 may also be coupled to one or more of the host systems 120A-B via network 108. Client device 130 may communicate with one or more of the VMs 122A-D of host systems 120A-B to control operation of one or more of the VMs 122A-D. Client device 130 may be any data processing device, such as a desktop computer, a laptop computer, a mainframe computer, a personal digital assistant, a rackmount server, a hand-held device or any other device configured to process data.

In one example, each of the host systems 120A-B may include a VM library 126A-B. The VM libraries 126A-B may include paused VM images of one or more common VM configurations. For example, the VM libraries 126A-B may include a number of the most common VM configurations that have been instantiated and then paused. The VM library 126A and 126B may be identical and may each include the same VM images so that the images, or portions of the images can be searched and retrieved at each host system 120A-B.

For example, in response to determining that a VM (e.g., VM 122A) is to be migrated to host system 120B, a migration module at host system 120A (e.g., in hypervisor 124A) may compare contents (e.g., pages of memory) of the VM 122A to the contents of the VM images in VM library 126A to determine if any of them match the contents of the VM 122A. If the contents do match, the migration module at host system 120A may forward an identifier, or identifiers, of the matching content to the host system 120B. The migration module of host system 120A may migrate the remaining content that did not match any of the VM images in VM library 126A as normal. That is, the content that did not match is copied to host system 120B via network 108. The content that did match does not have to be transferred over the network 108 and can rather be retrieved (e.g., by a migration module of host system 120B) from VM library 126B of host system 120B using the forwarded content identifiers. Accordingly, the VM 122A can be rebuilt at host system 120B using the content copied over the network 108 and the content retrieved from VM library 126B.

Figure 2:
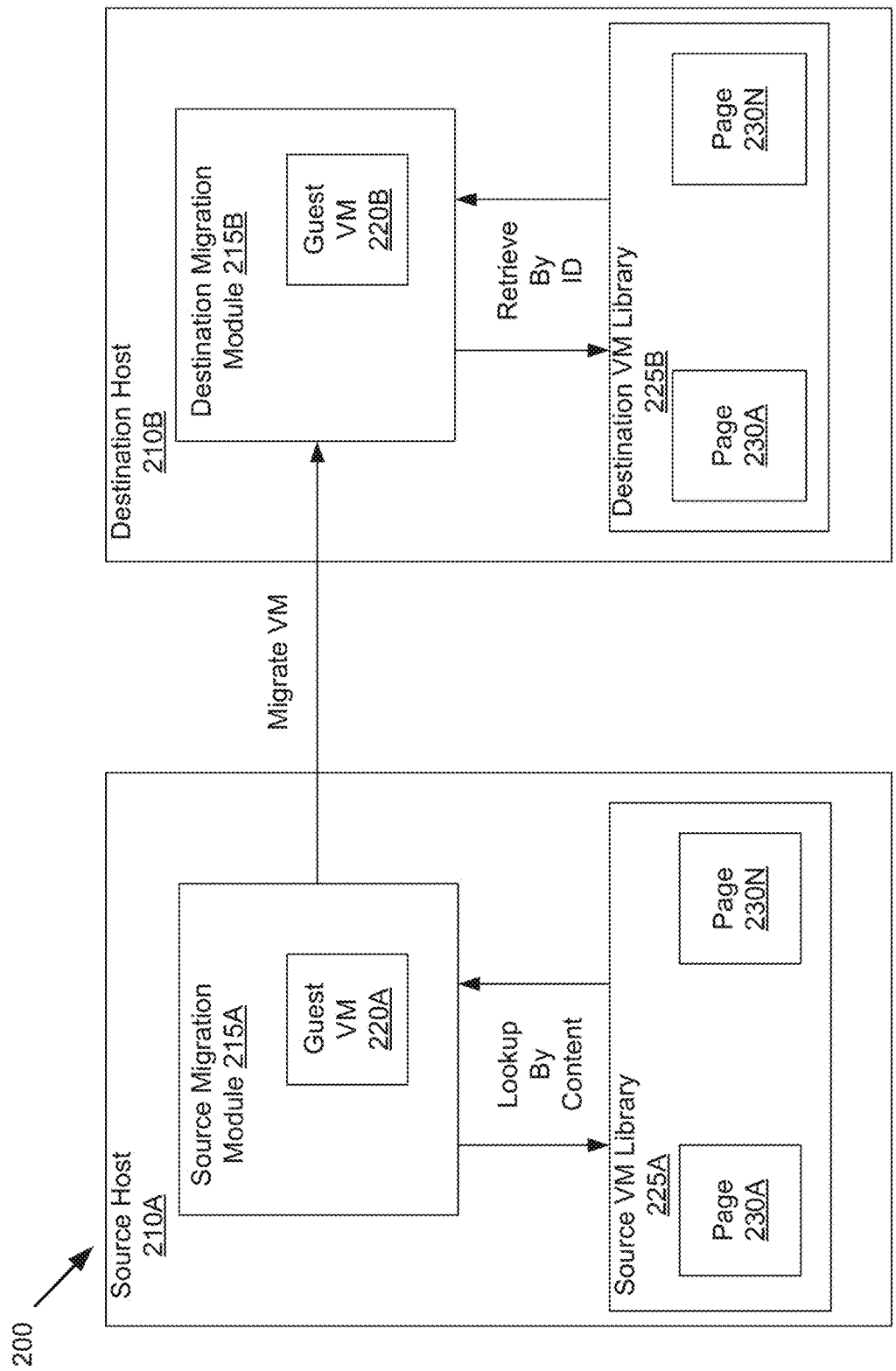
FIG. 2 is a system diagram that illustrates another example of a system for library based virtual machine migration in accordance with embodiments of the disclosure.

FIG. 2 is a block diagram that illustrates a system 200 for library based virtual machine migration, according to some embodiments. The system 200 includes a source host 210A including a source migration module 215A and a source VM library 225A. The source VM library 225A may include one or more pages 230A-N of one or more virtual machine images (e.g., paused virtual machines). The source migration module 215A may migrate a guest VM 220A to a destination host 210B. The destination host 210B may include a destination migration module 215B and a destination VM library 225B. The destination VM library 225B may include the same one or more pages 230A-N of the same one or more virtual machine images as source VM library 225A. Destination migration module 215B may receive and re-build the migrated guest VM 220B.

In one example, the source migration module 215A may determine to migrate the guest VM 220A to destination host 210B. For example, source migration module 215A may be included in a hypervisor of the source host 210A for managing execution of the guest VM 220A. The source migration module 215A may then perform a lookup (i.e., a search and comparison) for each page, or any other portion of the guest VM 220A against the pages 230A-N of source VM library 225A. If the compared page of the guest VM 220A matches one of the pages 230A-N, then the source migration module 215A may transmit, to the destination host 210B, the identifier of the matched page rather than the page of the guest VM 220A. Any of the pages of the guest VM 220A that are not matched with one of the pages 230A-N are copied to the destination host 210B. It should be noted that any portion of the guest VM 220A may be compared against the VMs of the source VM library 225A, such as a page of memory, a block of memory, a portion of storage, a CPU state, etc.

At the destination host 210B, the destination migration module 215B receives each of the coped pages of the guest VM 220A and the identifiers of the pages 230A-N that matched one of the pages of the guest VM 220A. The destination migration module 215B may then use the identifiers to retrieve, from the destination VM library 225B, the pages 230A-N associated with the identifiers. The identifiers may identify which of the plurality of VM images of the VM library 225A-B the page is associated with and which part of the state of the corresponding VM image the page is located in. For example, the identifier may indicate an offset of the page, the size of the page, or any other information to locate and retrieve the page from the destination VM library 225B. The destination migration module 215B may then use the copied pages and the pages retrieved from the destination VM library to build and initialize the guest VM 220B on the destination host 210B. The source VM library 225A and the destination VM library 225B may be local to the source host 210A and the destination host 210B respectively, or located and accessed remotely.

Figure 3:
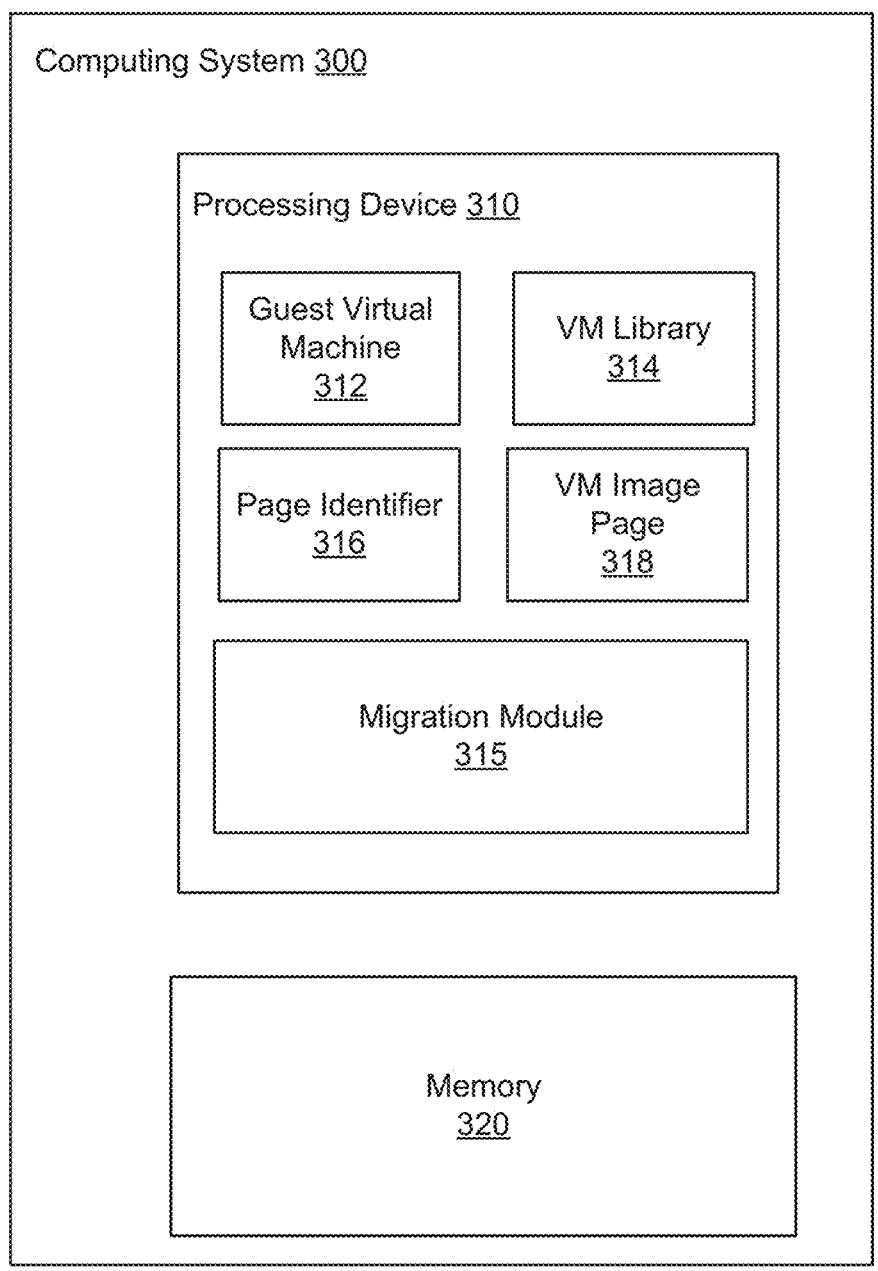
FIG. 3 is a block diagram that illustrates another example of a system for library based virtual machine migration in accordance with embodiments of the disclosure.

FIG. 3 is a computing system 300 for library based virtual machine migration. Computing system 300 includes a processing device 310 and a memory 320. Memory 220 may include volatile memory devices (e.g., random access memory (RAM)), non-volatile memory devices (e.g., flash memory) and/or other types of memory devices. The processing device may include a migration module 315, which may be the same or similar to source migration module 215A or destination migration module 215B as described with respect to FIG. 2. Processing device 210 may further include a guest virtual machine 312, a VM library 314, a page identifier 316, and a VM image page 318. In one example, the migration module 315 may determine that the guest virtual machine 312 is to be migrated from one host machine to another. The migration module 315 may then determine whether any portions (e.g., pages) of the guest virtual machine 312 matches any portions of virtual machine images included in VM library 314. For example, the VM library 314 may include one or more paused virtual machines with common VM configurations. The VM library 314 may also include a page identifier 316 for each page, or portion, of the VM images included in the VM library 314. Each portion (e.g., VM image page 318) of the VM images may be associated with a unique identifier (i.e., page identifier 316). The page identifier 316 may identify which of the plurality of VM images of the VM library 314 the VM image page 318 is associated with and which part of the state of the corresponding VM image the VM image page 318 is located in. For example, the page identifier 316 may indicate an offset of the VM image page 318, the size of the VM image page 318, or any other information to locate and retrieve the VM image page 318 from the destination VM library 314.

The migration module 315 may retrieve from the VM library 314 the page identifier 316 for any VM image page 318 of the VM library 314 that matches a portion of the guest virtual machine 312. Upon migration of the guest virtual machine 312 to a destination host machine, the migration module 315 may forward the page identifier 316 for each of the matched VM image pages 318 to the destination host rather than transmitting the actual pages of the guest virtual machine 312 to the destination host. The pages of the guest virtual machine 312 that do not match any portions of the VM images in the VM library 314 may be transmitted (i.e., copied) to the destination host machine.

The destination host machine may also include a migration module to receive the migrated pages of the guest virtual machine 312 and the page identifiers 316. The migration module at the destination host machine may then retrieve the pages corresponding to the page identifiers 316 from a VM library that is the same as VM library 314. The migration module at the destination host machine may then start the guest virtual machine 312 on the destination host using the copied pages and the pages retrieved from the VM library at the destination host.

Figure 4:
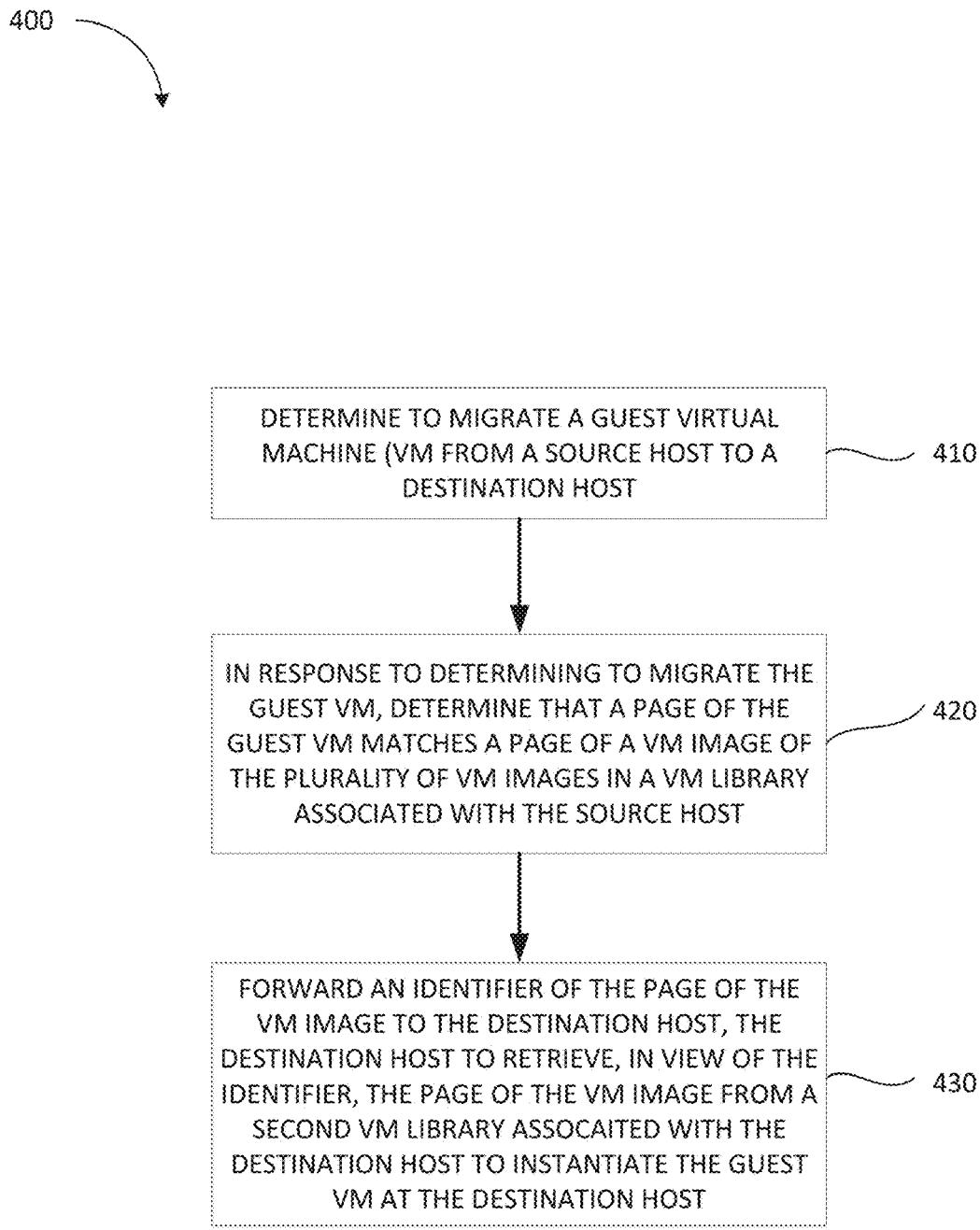
FIG. 4 is a flow diagram of a method of library based virtual machine migration in accordance with some embodiments.

FIG. 4 is a flow diagram of a method 400 of library based VM migration in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a migration module 315 of FIG. 3.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic determines to migrate a guest virtual machine from a source host to a destination host. In one example, a migration module may be included on the source host (e.g., in a hypervisor) or may otherwise be in communication with the source host. The migration module may determine to migrate the guest virtual machine in response to a request to migrate the guest VM. In another example, the processing logic may determine to migrate the guest VM for purposes of load balancing within a cluster or for any other purposes for which a VM migration may be performed. The source host and destination host may be any two host machines that are in communication with each other.

At block 420, in response to determining to migrate the VM, the processing logic determines that a page of the guest VM matches a page of a VM image of a plurality of VM images in a VM library associated with the source host. The processing logic may compare each page of the guest VM to each of the pages of the plurality of VM images to determine if there are any matches. If there are matches between one or more pages of the guest VM and the pages of the VM images in the VM library, then an identifier of each of the pages of the VM images in the VM library that were matched may be retrieved. For example, a unique identifier may be associated with each page of the VM images in the VM library. Accordingly, the unique identifier can be retrieved when one of the pages of the VM images in the VM library is matched with a page of the guest VM.

At block 430, the processing logic forwards an identifier of the page of the VM image to the destination host, the destination host to retrieve, in view of the identifier, the page of the VM image from a second VM library associated with the destination host to instantiate the guest VM at the destination host. Rather than copying each of the pages of the guest VM to the destination host, the processing logic forwards the identifiers of pages in the VM library that were matched with pages of the guest VM. The destination host may include, or have access to, the same VM library as the source host. Accordingly, the destination host can use the page identifiers that are forwarded from the source host to retrieve the corresponding pages from the VM library. The destination host may then use the pages retrieved from the VM library to build the guest VM at the destination host.

Figure 5:
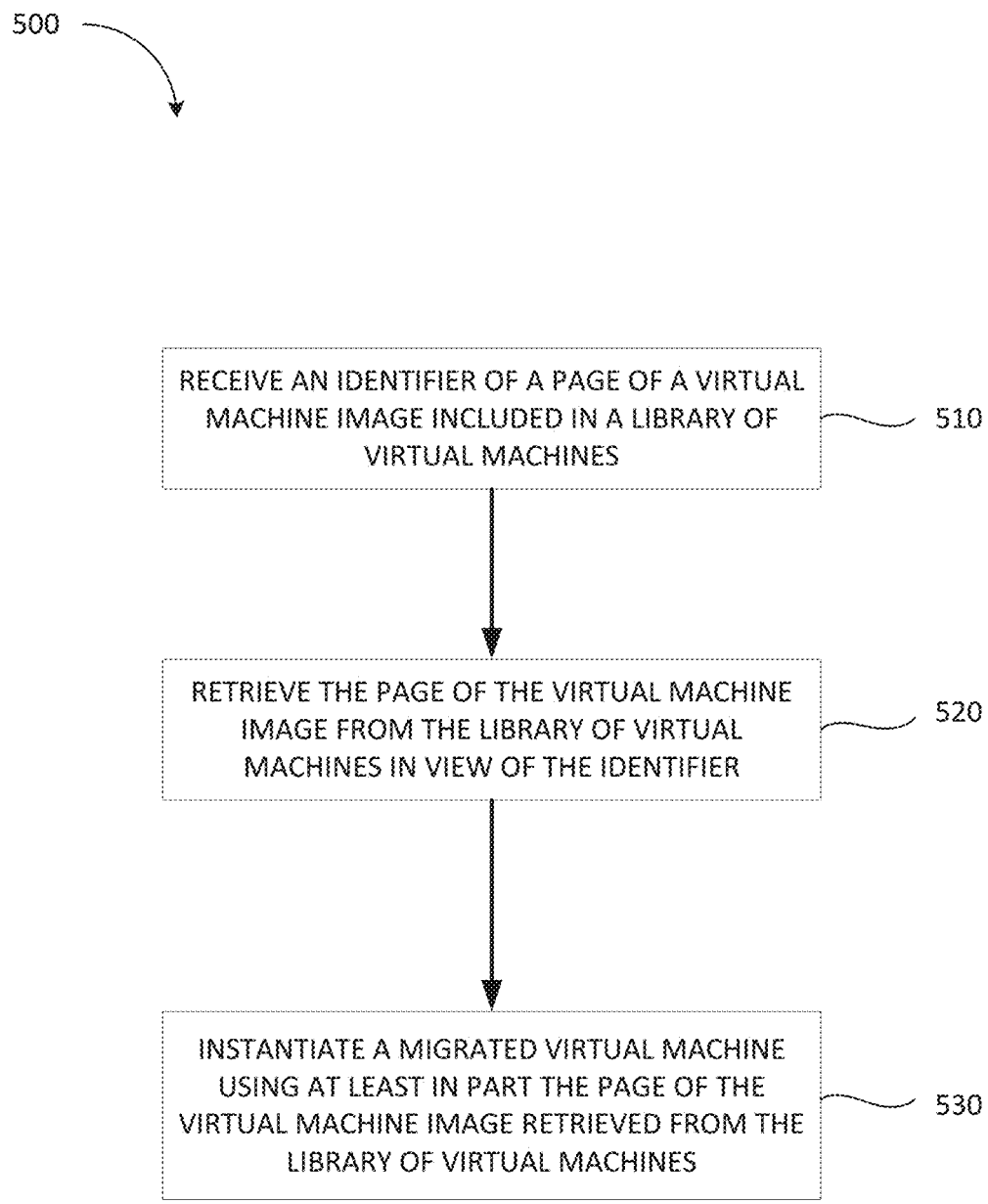
FIG. 5 flow diagram of another method of library based virtual machine migration, in accordance with some embodiments.

FIG. 5 is a flow diagram of a method 500 of library based VM migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a migration module 315 of FIG. 3.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives an identifier of a page of a virtual machine image included in a library of virtual machines. The library of VMs may include VM images of paused virtual machines with common configurations. At block 520, the processing logic retrieves the page of the virtual machine image from the library of virtual machines in view of the identifier. Each page in the library of virtual machines may be associated with a unique identifier. Therefore, the processing logic can use the received identifier to retrieve the page of the VM image.

At block 530, the processing logic instantiates a migrated virtual machine using at least in part the page of the virtual machine image retrieved from the library of virtual machines. In one example, one portion of the migrated VM is instantiated from the pages of retrieved from the library while the other portion is instantiated from the pages copied over the network. In another example, the entire migrated VM is instantiated using pages retrieved from the library (e.g., if the entire migrated VM matches a VM image in the VM library).

Figure 6:
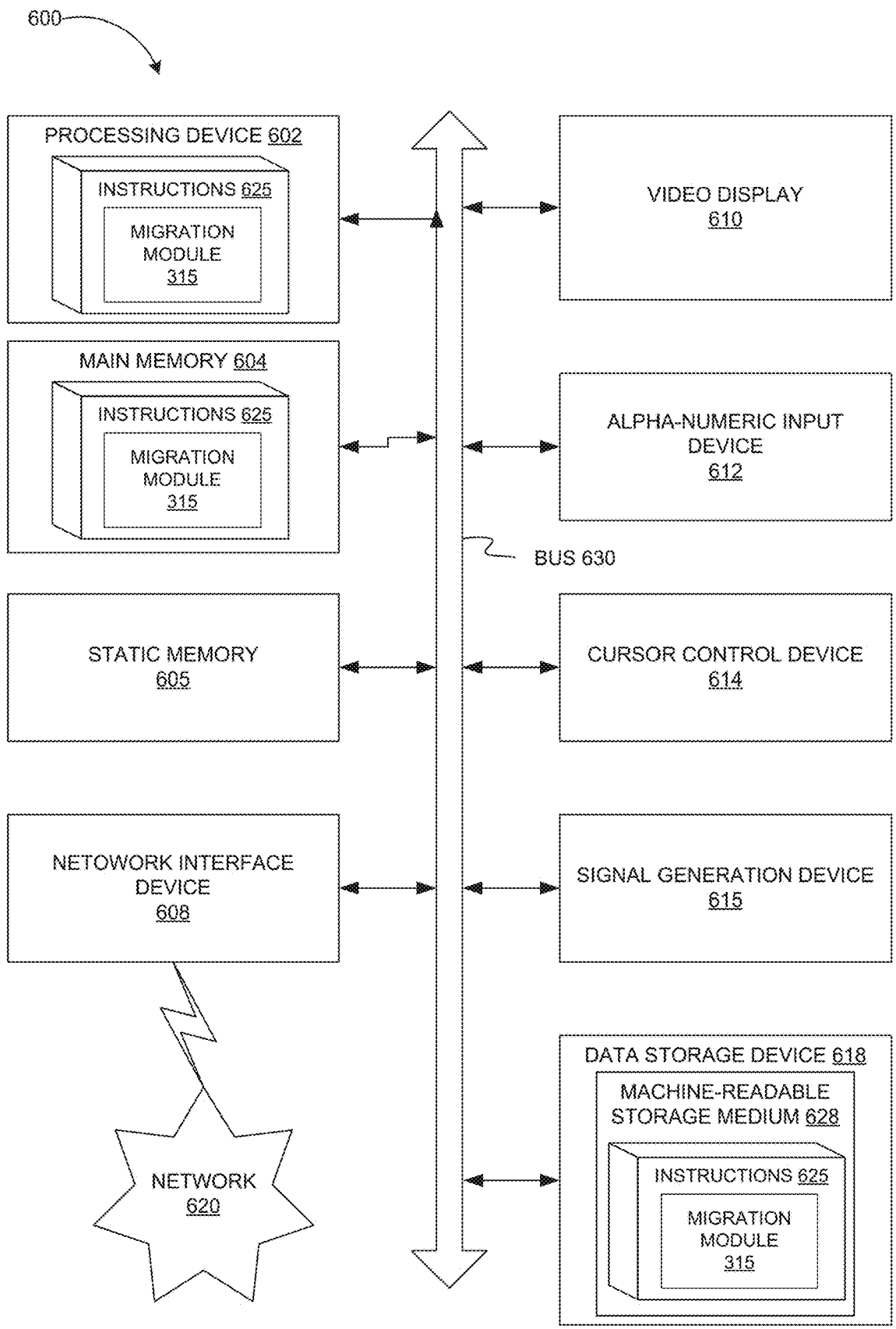
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a networking migration controller, e.g., migration module 315, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   generating a common virtual machine (VM) library comprising a plurality of VM images corresponding to a most common configured subset of VMs of a plurality of VMs that have been instantiated, each VM image comprising of one or more pages;
   storing a first copy of the common VM library to a source host and a second copy of the common VM library to a destination host, the first copy being the same as the second copy;
   determining to migrate a guest VM from the source host to the destination host;
   in response to determining to migrate the guest VM, determining, by a processing device, whether each page of a plurality of pages of the guest VM matches a page of a VM image of the plurality of VM images in the common VM library by comparing the VM image to the first copy of the common VM library stored at the source host;
   for each page of the plurality of pages of the guest VM:
      in response to determining that the page of the quest VM matches the page of a the VM image of the plurality of VM images in the common VM library, determining an identifier of the page of the VM image in the common VM library matching the page of the guest VM, and sending the determined identifier to the destination host; and
      in response to determining that the page of the quest VM does not match any page of the plurality of VM images, copying the page of the quest VM to the destination host;
   for each determined identifier received from the source host, retrieving, by the destination host, a page corresponding to the received determined identifier of the VM image from the second copy of the common VM library stored at the destination host; and
   rebuilding, by the destination host, the quest VM using the retrieved page and copied pages of the guest VM to instantiate the guest VM at the destination host.

2. The method of claim 1, wherein determining that the page of the guest VM matches the page of the VM image of the plurality of VM images in the common VM library comprises performing a lookup in the first copy of the common VM library using content of the page of the guest VM.

3. The method of claim 1, wherein the identifier uniquely identifies the page of the VM image of the plurality of VM images in the first copy of the common VM library and the second copy of the common VM library.

4. A system comprising:
   a memory; and
   a processing device operatively coupled to the memory, the processing device to:
      generate a common virtual machine (VM) library comprising a plurality of VM images corresponding to a most common configured subset of VMs of a plurality of VMs that have been instantiated, each VM image comprising of one or more pages;
      store a first copy of the common VM library to a source host and a second copy of the common VM library to a destination host, the first copy being the same as the second copy;
      determine to migrate a guest VM from the source host to the destination host;
      in response to determining to migrate the guest VM, determine whether each page of a plurality of pages of the guest VM matches a page of a VM image of the plurality of VM images in the common VM library by comparing the VM image to the first copy of the common VM library associated with the source host;
      for each page of the plurality of pages of the quest VM:
         in response to determining that the page of the quest VM matches the page of the VM image of the plurality of VM images in the common VM library, determine an identifier of the page of the VM image in the common VM library matching the page of the guest VM, and sending the determined identifier to the destination host; and
         in response to determining that the page of the quest VM does not match any page of the plurality of VM images, copying the page of the quest VM to the destination host;
      for each determined identifier received from the source host, retrieve, by the destination host, a page corresponding to the received determined identifier of the VM image from the second copy of the common VM library stored at the destination host; and
      rebuild, by the destination host, the quest VM using the retrieved page and copied pages of the guest VM to instantiate the guest VM at the destination host.

5. The system of claim 4, wherein to determine that the page of the guest VM matches the page of a VM image of the plurality of VM images in the common VM library the processing device is to:
   perform a lookup in the first copy of the common VM library using content of the page of the guest VM.

6. The system of claim 4, wherein the identifier uniquely identifies the page of the VM image of the plurality of VM images in the first copy of the common VM library and the second copy of the common VM library.

7. A non-transitory computer-readable storage medium including instructions that, when executed by a processing device, cause the processing device to:

generate a common virtual machine (VM) library comprising a plurality of VM images corresponding to a most common configured subset of VMs of a plurality of VMs that have been instantiated, each VM image comprising of one or more pages;

store a first copy of the common VM library to a source host and a second copy of the common VM library to a destination host, the first copy being the same as the second copy;

determine to migrate a guest VM from the source host to the destination host;

in response to determining to migrate the guest VM, determine whether each page of a plurality of pages of the guest VM matches a page of a VM image of the plurality of VM images in the common VM library by comparing the VM image to the first copy of the common VM library associated with the source host;

for each page of the plurality of pages of the quest VM:
in response to determining that the page of the guest VM matches the page of the VM image of the plurality of VM images in the common VM library, determine an identifier of the page of the VM image in the common VM library matching the page of the guest VM, and sending the determined identifier to the destination host; and in response to determining that the page of the quest VM does not match any page of the plurality of VM images, copying the page of the quest VM to the destination host;

for each determined identifier received from the source host, retrieve, by the destination host, a page corresponding to the received determined identifier of the VM image from the second copy of the common VM library stored at the destination host; and rebuild, by the destination host, the quest VM using the retrieved page and copied page of the guest VM to instantiate the guest VM at the destination host.

8. The non-transitory computer-readable storage medium of claim 7, wherein to determine that the page of the guest VM matches the page of a VM image of the plurality of VM images in the common VM library the processing device is to:

perform a lookup in the first copy of the common VM library using content of the page of the guest VM.

9. The non-transitory computer-readable storage medium of claim 7, wherein the identifier uniquely identifies the page of the VM image of the plurality of VM images in the first copy of the common VM library and the second copy of the common VM library.

* * * * *